(12) United States Patent　　(10) Patent No.: US 7,152,367 B2
Mastronardi　　(45) Date of Patent: Dec. 26, 2006

(54) PLANT SUPPORT J HOOK

(76) Inventor: Ester Mastronardi, 279 Talbot St. West, Leamington, Ontario (CA) N8H 4H3

( * ) Notice: Subject to any disclaimer, the term of this patent is extended or adjusted under 35 U.S.C. 154(b) by 210 days.

(21) Appl. No.: 10/400,782

(22) Filed: Mar. 27, 2003

(65) Prior Publication Data

US 2004/0083584 A1　May 6, 2004

Related U.S. Application Data

(60) Provisional application No. 60/368,031, filed on Mar. 27, 2002.

(51) Int. Cl.
*A01G 17/08* (2006.01)
*A44B 21/00* (2006.01)

(52) U.S. Cl. ............... 47/47; 24/344; 24/345; 24/346; 47/44

(58) Field of Classification Search .......... 24/326, 24/457, 458, 339, 546, 298, 907, 910, 318, 24/321, 199, 565, 570, 129 R, 130, 115 A, 24/530–532, 344–346; 47/72, 41.01, 44, 47/47, 67, 46; 248/692, 693, 61, 339, 340, 248/341

See application file for complete search history.

(56) References Cited

U.S. PATENT DOCUMENTS

| | | | |
|---|---|---|---|
| 294,240 A | 2/1884 | Judd | |
| 466,932 A | 1/1892 | Cornell | |
| 899,046 A | 9/1908 | Henshaw | |
| 983,167 A | 1/1911 | Poalk | |
| 1,754,534 A * | 4/1930 | Vought | 47/47 |
| 2,152,018 A | 3/1939 | Barnhart | |
| 2,810,176 A * | 10/1957 | Gaafar | 24/546 |
| 2,976,593 A * | 3/1961 | Exton | 24/532 |
| 3,057,093 A | 10/1962 | Gallo | |
| 3,302,328 A * | 2/1967 | King | 47/47 |
| 3,484,070 A * | 12/1969 | Horodko | 248/317 |
| 3,692,269 A * | 9/1972 | Hales | 248/691 |
| 3,950,823 A | 4/1976 | Schreter | |
| 4,050,187 A * | 9/1977 | Geiger et al. | 47/45 |
| 4,099,299 A * | 7/1978 | Bruggert et al. | 47/44 |
| 4,176,494 A * | 12/1979 | Boucher et al. | 47/47 |
| 4,615,140 A | 10/1986 | Frano | |
| 4,728,068 A * | 3/1988 | Rivkin | 248/220.31 |
| 4,823,962 A * | 4/1989 | Arias | 211/34 |
| 5,809,618 A * | 9/1998 | Perhacs | 24/71.1 |
| 5,979,110 A * | 11/1999 | Tai | 47/41.01 |
| D420,554 S * | 2/2000 | Evans | D8/1 |
| 6,220,554 B1 | 4/2001 | Daoud | |
| 6,378,175 B1 | 4/2002 | Vanderpan | |
| 6,588,147 B1 * | 7/2003 | Bayly et al. | 47/47 |

* cited by examiner

*Primary Examiner*—Jack W. Lavinder
(74) *Attorney, Agent, or Firm*—Reising, Ethington, Barnes, Kisselle, P.C.

(57) ABSTRACT

A plant support hook having an elongated shaft with a U-shaped hook supported at one end of the and forming a resilient interlock with the shaft to engage a string-like support for the U-shaped hook and a J-shaped hook on the other end of the shaft for supporting a branch of the plant.

2 Claims, 1 Drawing Sheet

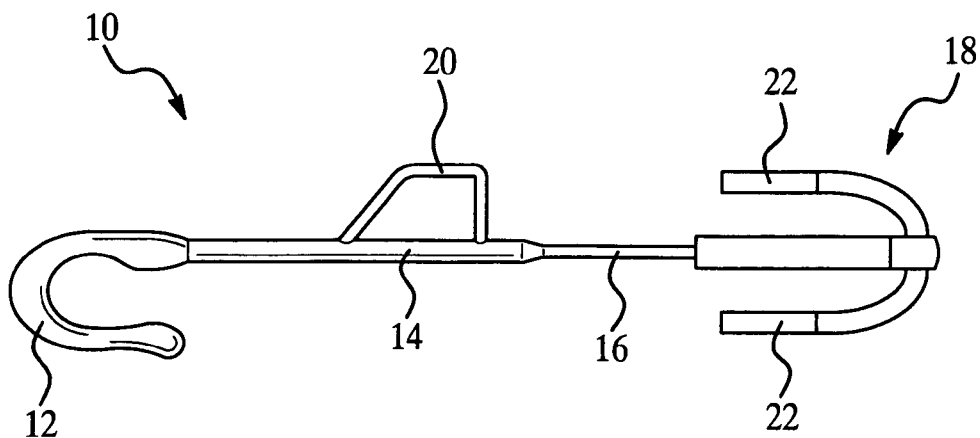
_Figure 1_
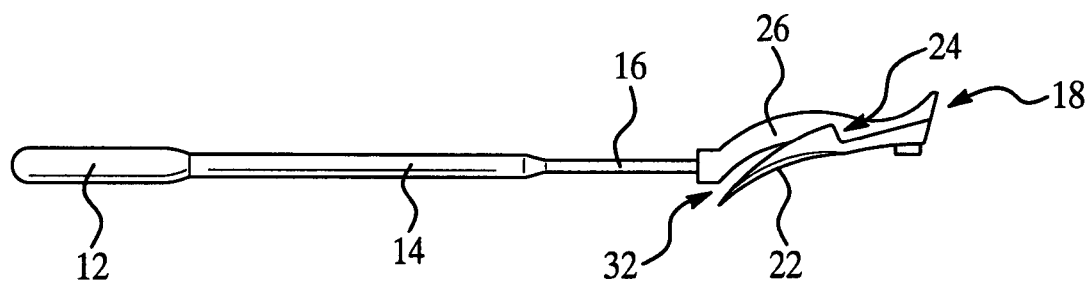
_Figure 2_
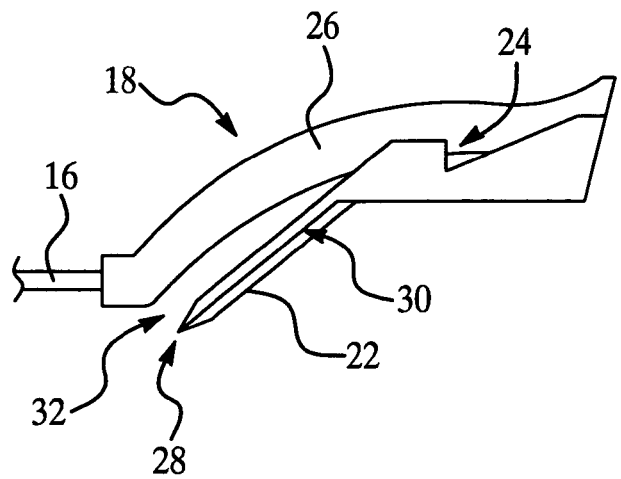
_Figure 3_

PLANT SUPPORT J HOOK

CROSS-REFERENCE TO RELATED APPLICATION

This application is based on Provisional Application Ser. No. 60/368,031, filed Mar. 27, 2002 and the priority thereof is claimed for this application.

TECHNICAL FIELD

This invention relates to a plant support device and specifically to a plant support J hook to secure a limb of a plant to a support structure.

BACKGROUND OF THE INVENTION

Typically in agricultural product support structures are used to increase yield by supporting the plant and prevent branches from kinking. A kinking branch will restrict flow of water and nutrients to fruit or vegetables growing from the plant. A weighted down branch kinks to prevent nutrients from flowing to the vegetables of fruit. Typically, a support is used to prevent ranches of a plant from kinking.

One type of support structure includes a string or wire extending vertically and parallel relative to the plant. Support clips are attached to the support structure and the plant to support the weight of the fruit or vegetables born by the plant.

Agricultural operations are labor intensive and the installation of support clips to each individual plant is time consuming and expensive. Installation of plastic clips to support structures requires workers to revisit each plant during growth to install additional clips to support the plant.

For these reasons it is desirable to provide a support clip that is easy to install in order to expedite installation. Further, many plants are disposed of after harvest. Removal of support clips from each plant before disposal is inefficient and costly. Therefore, it is desirable that a support clip be inexpensive such that disposal and repurchase of the support clip is economically feasible relative to the cost of removing the clips from a harvested plant.

BRIEF DESCRIPTION OF THE DRAWINGS

Preferred exemplary embodiments of the invention will hereinafter be described in conjunction with the appended drawings, wherein like designations denote like elements, and wherein:

FIG. 1 is a top view of an embodiment of a plant support device of the present invention;

FIG. 2 is a side view of the plant support device of FIG. 1; and

FIG. 3 is an enlarged, fragmentary view of the clip of the plant support device of FIG. 1.

DETAILED DESCRIPTION OF THE PREFERRED EMBODIMENT

Referring to FIGS. 1–3, the support clip of this invention is a J hook 10 including a hook portion 12 attached to a shaft 14. On the shaft 14 is a grip 20. The grip 20 provides a grasp point on the J hook 10 for installation to the plant. A clip portion 18 attaches the J hook 10 a support structure. The clip 18 is secured to the shaft 14 by way of a shaft 16 of a smaller diameter. The small diameter of the shaft 16 allows for the hook 12 to twist relative to the clip 18. During installation, the clip 18 may not be assembled to the support structure in a way that provides for optimum alignment and connection to the plant. Therefore, the smaller diameter shaft portion 16 allows for the hook 12 to twist relative to the clip 18 to accommodate varying alignments of the plant. Further, twisting of the hook 12 relative to the clip 18 allows for the installation onto many stems or branches regardless of the position of the support structure.

The clip 18 includes a body portion 26 and a leg portion 22. Each leg portion 22 extends parallel to the body portion 26. Each leg portion 22 includes a catch portion 24. In operation, the catch portion 24 traps the support wire or string after guiding over the leg 22. The string or support wire is then trapped between the catch portion 24 and the bottom of the body portion 26. This configuration allows for quick assembly to a support to expedite installation of the J hook 10 to a plant. The J hook 10 of this invention provides the grip 20 on a side opposite that of hook 12. This configuration accommodates assembly to the plants because the operator's hand is not an obstacle to installation to the plant.

A great concern in the manufacture of the J hook 10 of this invention is cost. Cost of the J hook 10 must be such that it is economically feasible to dispose of the J hook 10 with the plant after the fruit or vegetable is harvested from the plant. It is for this reason that unique molding techniques have been incorporated into production of the J hook 10. A parting line 30 is used to form the sharp point or edge of 28 of each leg 22. The edge 28 assists in installation of the J hook 10 by providing an easy catch of the wire or support line by an operator grasping the J hook at the grip 20. Supporting line 30 forms the tip or edge 28 of each leg 22.

In operation, the worker grasps the J hook 10 by the grip 20. The string or support wire guides along the bottom portion of the body 26 in a direction indicated by 32. The wire or support string guides upward along the leg 22 and into the catch portion 24. The catch portion 24 is substantially parallel to the body portion 26 such that a desired amount of tension is exerted on to the wire or support string to prevent the J hook 10 from sliding downward along the support wire or string. As appreciated it is desired for a J hook 10 to remain on the support in the location assembled, while also being easily movable along the support. The catch portion 24 is parallel to the bottom body portion 26 such that the clip 10 remains in place along the support.

Preferably, the Clip 10 is fabricated from a copolymer polypropylene that includes an ultraviolet stabilizer. As appreciated the environment in which the 3 hook 10 is installed includes a great deal of ultraviolet light. For this reason, degradation of the J hook caused by the ultraviolet light is addressed by the specific use of material. Although preferably a copolymer polypropylene is used with this J hook clip it is with the contemplation of this invention that other materials may be used that are compatible with use and exposure to ultraviolet radiation.

The foregoing description is exemplary and not just to the material specification. The invention has been described in an illustrative manner, and should be understood the terminology used is intended to be in a nature of description rather than of limitation. Many modifications and variations of the present invention are possible in light of the above teachings. The preferred embodiments of this invention have been disclosed, however, one of ordinary skill in the art would recognize that certain modifications are within the scope of this invention.

What is claimed is:

1. A device for supporting a plant comprising:

a unitary body of polymeric material including an elongated shaft terminating at one end in a hook portion for attachment to the plant and terminating at the other end in a clip for attachment to a string-like support, said shaft having a first cross-sectional area in a first region adjacent said hook portion and having a second cross-sectional area in a second region adjacent said clip, said second section cross-sectional area being smaller than said first cross-sectional area whereby twisting of said shaft is facilitated in said second region, a radially extending flat grip member unitary with said first region for facilitating manual manipulation including twisting of said clip relative to said hook portion, said clip comprising a body portion and a pair of leg members disposed on opposite sides of said body portion with each leg member extending from a free end of said body member toward said one end of said shaft terminating in a free end, each leg member being substantially parallel to said shaft, a portion of said leg members lying in a substantially common plane with said hook portion and said grip member, each of said leg members defining a ramp surface extending from its free end at an angle convergent with said body portion, said ramp surface terminating in a detent notch for capturing said string-like support between said body portion and said leg member, whereby said clip may be secured to said string-like support by forcing said string-like support between said ramp surface and said body portion.

2. A plant support device, comprising:

a unitary body of polymeric material including an elongated shaft, a hook portion at one end of said shaft, and a clip at another end of said shaft;

said shaft having a section of reduced thickness located between said hook portion and said clip, wherein said hook portion is designed to receive a section of a plant and is adjustable to different alignments relative to said clip;

said shaft further including a grip member for facilitating manual manipulation of said body including positioning of said hook portion relative to said clip;

said clip comprising a body portion and a pair of leg members disposed on opposite sides of said body portion such that said clip is attachable over a support line with the support line being captively held between said body portion and said leg members, wherein said leg members extend at an angle convergent with said body portion so as to guide the support line between said body portion and said leg members when said clip is being attached to the support line.

* * * * *